(No Model.)

B. A. BAKER.
STALK CUTTER WHEEL FOR SULKY PLOWS.

No. 408,283. Patented Aug. 6, 1889.

Attest:
Frank G. Clark
S. W. Brainerd

Inventor:
Bion A. Baker
By J. M. St. John
Atty

UNITED STATES PATENT OFFICE.

BION A. BAKER, OF GREELEY, IOWA.

STALK-CUTTER WHEEL FOR SULKY-PLOWS.

SPECIFICATION forming part of Letters Patent No. 408,283, dated August 6, 1889.

Application filed December 18, 1888. Serial No. 294,000. (No model.)

*To all whom it may concern:*

Be it known that I, BION A. BAKER, a citizen of the United States, residing at Greeley, in the county of Delaware and State of Iowa, have invented certain new and useful Improvements in Stalk-Cutter Wheels for Sulky-Plows; and I do hereby declare the following to be a full, clear, and exact description of the invention, such as will enable others skilled in the art to which it appertains to make and use the same.

The object of my invention is to clear the path of a plow from the common obstruction of cornstalks; and the invention consists, essentially, in the application of a stalk-cutter to the landward side of the plow, which is at once adapted to cut the stalks in advance of the plow and to serve as a carrying-wheel for the plow on that side.

Figure 1:
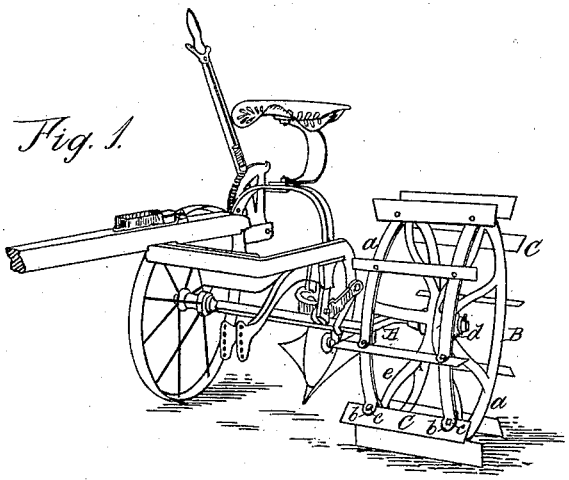
Figure 2:
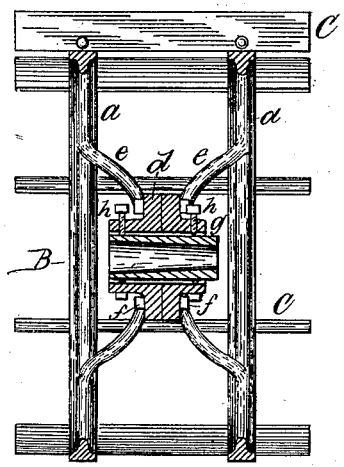
Figure 3:
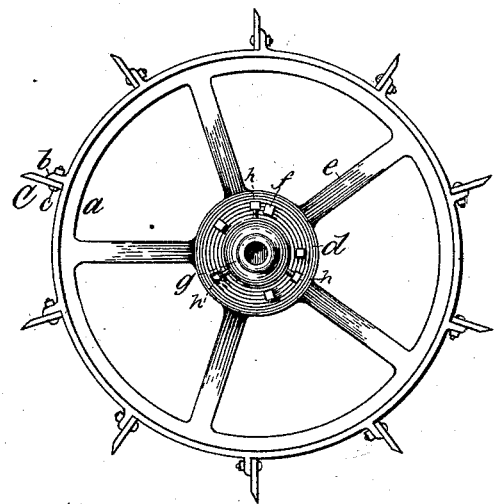

In the accompanying drawings, forming a part of this specification, Figure 1 represents a view in perspective of a device embodying my invention as applied to a sulky-plow; Fig. 2, a transverse section of the stalk-cutter in the line $x\ x$; Fig. 3, a side elevation of the same, and Fig. 4 a fragmentary sectional view of a modified form of wheel.

Similar letters of reference indicate corresponding parts.

Referring to the drawings, A is the axle of a sulky-plow, which is of the conventional style and need not be particularly described. On this axle is mounted a wheel B, provided with a series of cutting-blades C C. These blades are made of about the same length as the width of the furrow turned by the plow, or a little longer, so that in the turning of successive furrows the entire ground is covered by the stalk-cutter. The rim of the wheel should be continuous, so as to serve for a supporting-wheel for the plow, and so constructed it acts in the double capacity of land-wheel and stalk-cutter. This combination and arrangement constitutes the gist of my invention.

In practice I make the stalk-cutter wheel with a double rim $a\ a$, having lugs $b\ b$, to which the stalk-cutter blades are secured by suitable bolts $c\ c$. From these rims the spokes $e\ e$ converge to the hub $d$. For convenience in casting the wheel is made in two parts, being practically two dished wheels bolted together at the hub by bolts $f\ f$. In the hub is placed a bushing $g$, held in place and adjusted by means of the set-screws $h\ h$. The wheel should be sufficiently heavy to force the knives through the stalks, and is preferably made of cast-iron.

Figure 4:
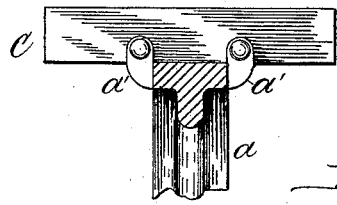

In Fig. 4 is shown a fragmentary sectional view of a modified form of wheel. In this case the wheel has a single felly, with lugs $a'\ a'$ at each side, to which the knives are bolted.

In its use as a carrying-wheel for the plow the stalk-cutter has been found to carry the plow more steadily in corn-ground than the common wheel. This is due to the fact that the ordinary wheel is obliged to ride over the hills, while in the case of the stalk-cutter the knives are either forced down into the hills, splitting and crushing them, or by striking the ground in front of them help to ease the rim of the wheel over the obstruction.

Having thus described my invention, what I claim as new, and desire to secure by Letters Patent, is—

1. The combination, with a plow, substantially as described, of a stalk-cutter composed of a wheel having a central hub adapted for mounting on the axle of the plow-sulky, and having a felly with a continuous tread and lugs for the attachment of stalk-cutter knives, and a series of radial knives secured transversely thereto of a length corresponding to practically the width of a furrow, whereby it is adapted to serve as a carrying-wheel for the landward side of the plow and as a stalk-cutter, substantially as set forth.

2. The herein-described stalk-cutter, adapted to be mounted on the axle of a sulky-plow, and consisting of a double-fellied wheel with a single hub, the felly provided with lugs for the attachment of stalk-cutter knives, and knives secured to said lugs, substantially as and for the purpose set forth.

In testimony whereof I affix my signature in presence of two witnesses.

BION A. BAKER.

Witnesses:
S. W. BRAINERD,
FRANK E. CLARK.